United States Patent [19]

Bertolotti

[11] Patent Number: 4,671,756
[45] Date of Patent: Jun. 9, 1987

[54] CUTTING DEVICE FOR THE HOT GRANULATION OF THERMOPLASTIC POLYMERS

[75] Inventor: Franco Bertolotti, Milan, Italy
[73] Assignee: Montedison S.p.A., Milan, Italy
[21] Appl. No.: 775,333
[22] Filed: Sep. 12, 1985
[30] Foreign Application Priority Data
Sep. 13, 1984 [IT] Italy ............... 22649 A/84
[51] Int. Cl.⁴ ............................. B02C 18/06
[52] U.S. Cl. .................... 425/142; 264/142; 425/313
[58] Field of Search ........... 425/71, 142, 311, 313, 425/67, 107, DIG. 230; 264/142

[56] References Cited

U.S. PATENT DOCUMENTS 3,196,487  7/1965  Snelling .................. 425/311
3,292,212  12/1966 Pomper .................... 425/311
4,529,370  7/1985  Holmes et al. ............ 425/142
4,569,809  2/1986  Baggett ................... 264/142

FOREIGN PATENT DOCUMENTS 3126550  7/1982  Fed. Rep. of Germany ...... 425/313

Primary Examiner—Jay H. Woo
Assistant Examiner—J. Fortenberry
Attorney, Agent, or Firm—Stevens, Davis, Miller & Mosher

[57] ABSTRACT

A cutting device for the hot granulation of thermoplastic polymers comprising a blade-carrying disc rigidly keyed onto the driving shaft and blades not rigidly mounted onto said disc, each blade being provided with a system which pushes it against the cutting plate and being integral with a sliding block which slides on said plate with indirect friction.

21 Claims, 6 Drawing Figures

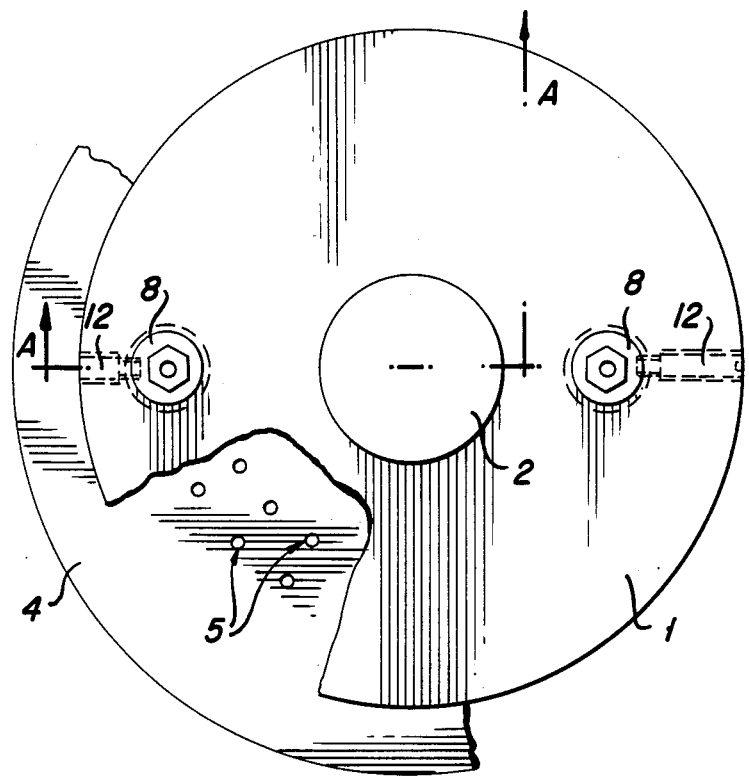
FIG. 1
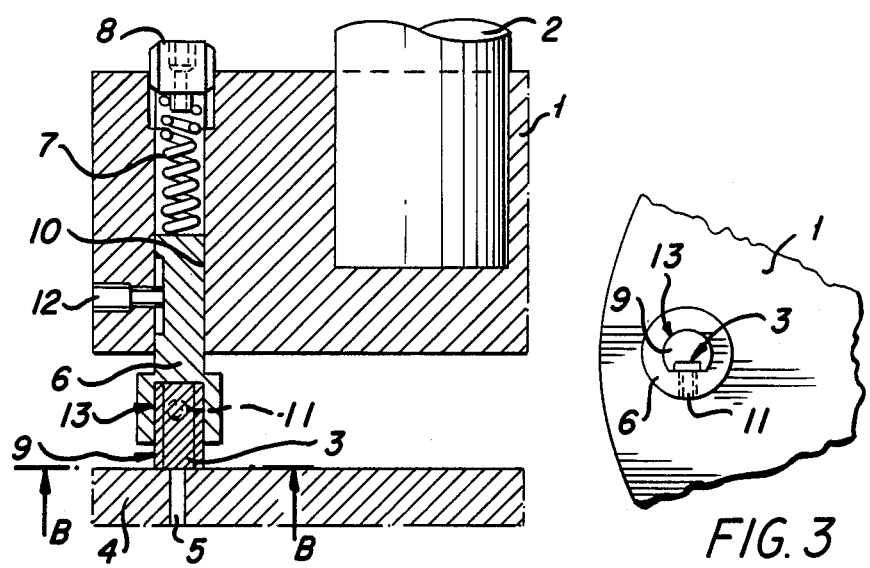
FIG. 2
FIG. 3

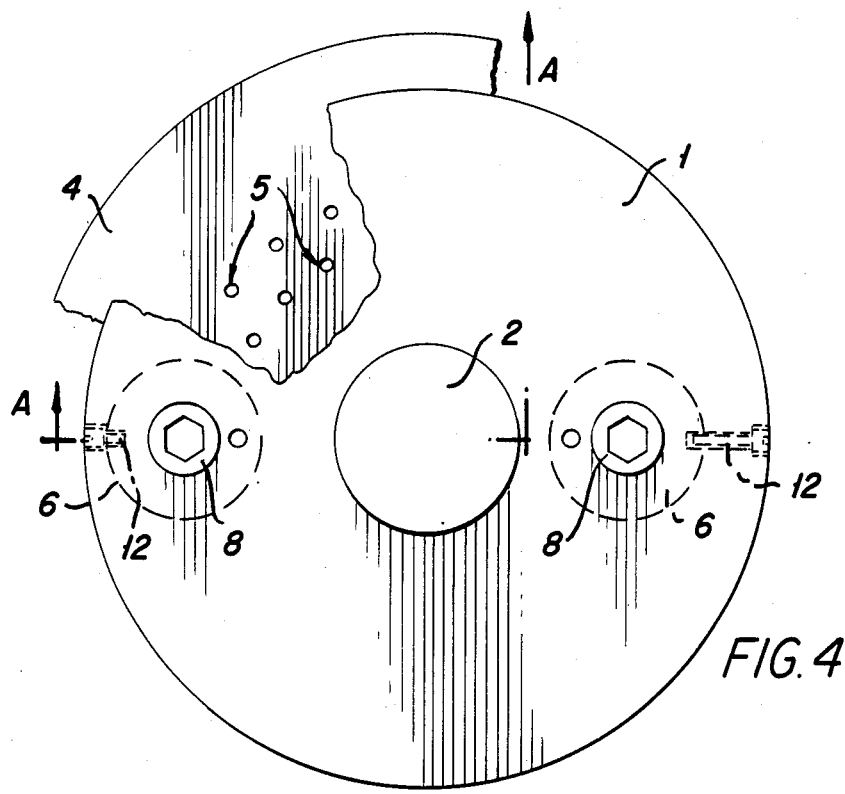
FIG. 4
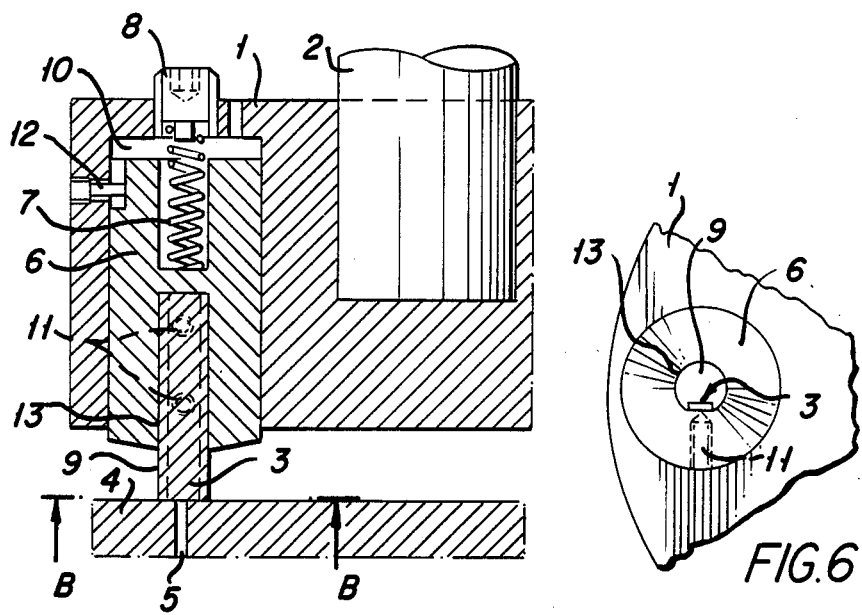
FIG. 5
FIG. 6

CUTTING DEVICE FOR THE HOT GRANULATION OF THERMOPLASTIC POLYMERS

The present invention relates to a cutting device for the hot granulation of thermoplastic polymers.

More particularly, this invention relates to a cutting device for the hot granulation of thermoplastic polymers in which polymeric monofilaments leaving the die are directly cut on the face of said die.

The known devices for the hot granulation of thermoplastic materials generally include:
(a) a die consisting of a heated drilled body;
(b) a cutting device comprising a rotary driving shaft equipped with a blade-carrying disc and a system for positioning the blades against the outer face of the die;
(c) a collecting chamber for the granules; and
(d) a system for feeding and distributing the thermoregulated fluid, generally water, necessary to cool and to carry the cut granules out of the collecting chamber.

The thermoplastic material in the molten state is extruded through the die holes; the monofilaments leaving the die are cut by the rotating blades and the resulting granules are cooled and removed by means of the thermoregulated fluid.

The cutting device generally comprises: a cutting plate consisting of the outer face of the die and blades, which are mounted on a blade-carrying disc keyed onto the driving shaft and are driven in rotary motion in front of the cutting plate, at a distance adjusted by means of an axial shifting device.

BACKGROUND OF THE INVENTION

Various hot cutting devices are known, which in practice, however, do not fully meet all the technological requirements.

There are known, for example, cutting devices having rigid blades integral with the driving shaft. In such devices, the blade adjustment is difficult and inaccurate, due to the axial rigidity of the complex, and in practice, as it is impossible to obtain a sufficiently uniform behavior of the blades, the consequence thereof is a cut of bad quality and/or a severe wear of the cutting elements.

With a view to overcome these drawbacks, cutting devices having elastic blades or an axially sprung blade-carrying disc have been proposed.

Due to the contact with friction between the blades and the die face, a diffused wear occurs in these devices.

Furthermore, these known cutting devices are not adapted to indiscriminate use with all types of thermoplastic polymers. In fact, the devices having rigid blades are not suitable for relatively soft or low viscosity polymers because, since the blades are to be regulated in a position very close to the die face, in practice there are some areas of irregular contact between the blades and plate, with consequent very severe wear.

Conversely, the cutting devices equipped with elastic blades or with a sprung blade-carrying disc are not suitable for use with polymers of relatively high viscosity and hardness because, since a high thrust of the blades against the plate is necessary, they undergo rapid wear.

THE PRESENT INVENTION

Thus, it is an object of the present invention to provide a cutting device for the hot granulation of thermoplastic polymers, which does not exhibit the above-cited drawbacks.

More particularly, the object of the present invention is that of providing a cutting device for the hot granulation of all types of thermoplastic polymers.

A further object of the present invention is that of providing a cutting device for the hot granulation of thermoplastic polymers, in which the blades contact the plate with practically no wear of the plate and with practically no wear or a controlled wear of the blades.

Still another object of the present invention is that of providing a cutting device for the hot granulation of thermoplastic polymers which permits to obtain a uniform behavior of each blade at each point of the cutting area.

I have now found, this being the purpose of the invention, that these and still other objects are achieved by means of a cutting device comprising a blade-carrying disc rigidly keyed onto the driving shaft and blades not rigidly mounted on the blade-carrying disc, each blade being equipped with an adjustable system which pushes it against the plate, and is integral with a sliding block which slides on the plate with indirect friction.

Preferably, each blade and the relevant sliding block should cover, in their motion, only one circular crown of extrusion holes, so that the contact uniformity with the plate may be secured even in the case of plates with an irregular or deformed surface.

The blades are rigid and are applied to the blade-carrying disc by means of an axial joint, such as, for example, a guided piston, an articulated parallelogram or an equivalent system, which permits the blade to move from and towards the plate. Due to their configuration and to the type of joint by which the blades are applied to the blade-carrying disc, said blades are able to provide a cutting force the component of which directed in parallel to the plate face is effective and the component of which directed perpendicularly to said face is negligible or not at all effective.

The capability of exerting such perpendicular cutting force component is imparted to each blade by a system, interposed between blade and blade-carrying disc, acting on the blade itself.

Such system acting on the blade may be an adjustable elastic element which pushes the blade against the plate, such as a spring, or an elastic means of any type, a hydraulically, pneumatically or electromagnetically driven device, etc., or, preferably, a group consisting of an opposing element, which opposes any sudden action tending to move the blade away from the plate and dimensioned as a function of the required cutting force, and of an elastic adjustable element having a resetting function capable of carrying the blade back to the working position, into contact with the plate, after each variation.

The opposing element may be a mass housed in a proper guide of the blade-carrying disc and capable of transmitting to the blade an inertial reaction with a component perpendicular to the plate face and directed against the same, such as e.g., a guided piston; or it may be a hydraulic shock absorber, or an electromagnetic reaction system or an electronic control system with equivalent effect, etc.

The resetting element may be a spring, any type of elastic means, a hydraulically, pneumatically or electromagnetically driven device, etc.

The sustentation of each blade is obtained by means of a sliding block, integral with the blade, sliding on the plate with indirect friction by means of solid-film or fluid-film lubrication, such as e.g., a hydrodynamic- or hydrostatic-sustentation sliding block, or by means of a sliding block with magnetic or electrostatic sustentation, or of any other type with equivalent effect. In the case of hot-cutting devices, both of the spraying type and of the under water type, it is preferred to utilize hydrostatic sustentation or hydrodynamic sustentation sliding blocks, which use the same cooling medium existing in the cutting chamber.

The group consisting of the system acting on the blade and of the sliding block is dimensioned and adjusted to simultaneously meet the process requirements, thus securing the necessary cutting force, and the functional requirements, thus securing the sustentation force necessary to avoid direct contact between sliding block and cutting plate.

Thus, for example, in the case of polystyrene granulation with dies having only one crown of extrusion holes with diameters ranging from 0.8 to 1.5 mm and a pitch of from 10 to 50 mm, with a spray cooling system using water at 30°-60° C., with blades guided at a speed of 10-20 m/second, each blade being equipped with a hydrodynamic-sustentation sliding block having a circular contact surface on the plate with diameter ranging from 10 to 20 mm, satisfactory results are obtained by equipping each blade with a spring adjusted at a load of 50-500 N, or with a group consisting of an inertial mass of 0.5-1.5 kg and of a resetting spring adjusted at a load of 5-500 N.

The cutting plate may be manufactured from any rigid and hard material, such as steels, hardened, case-hardened or nitrided steels, metals, or alloys having hardened surface layer obtained by chemical and/or thermal treatment, or by deposition of ceramic materials, such as chromium oxide or tungsten carbide, etc., bronzes or wear-resistant alloys, and the like.

The plate surface is rectified or lapped, at least in the circular areas of contact with the sliding blocks and with the blades, in accordance with the tribology rules.

The blades may be manufactured from the materials usually utilized for such purpose, such as, for example, treated or untreated steels and alloys, with or without wear-resistant coating materials, brass, wear-resistant bronzes, and the like.

The materials utilized for manufacturing the sliding blocks which support the blades vary as a function of the type of construction, and of the operating conditions. Thus, in the case of the hydrodynamic sustentation sliding blocks, the materials utilized are, for example, graphite, carbon, filled graphites or carbons, ceramic materials, metals, alloys, plastics such as fluorinated resins and epoxy resins, either filled or not, and the like.

The opposing element may be made of any metallic or non-metallic material, as long as the necessary mass is provided.

To facilitate the smooth sliding of the opposing element, the guiding seat thereof can be coated with bronzes, teflon, graphite, etc., and/or it can be properly lubricated by means of water, oil, etc.

The device, object of the present invention, permits to obtain, between sliding blocks and cutting plate, tribological indirect-friction conditions, which permit the reduction to practically negligible values the wear of the blades and of the plate, either of the abrasive or of the adhesive type.

If so desired, it is possible to obtain, by a proper choice of the materials of which the blades are constructed and of the sliding blocks, of their range of speed and/or by the dimensioning of the parts, a controlled degree of wearing of the blades which permits to achieve, during operation, a continuous regrinding of the cutting edges of the blades.

Further advantages of the device of the present invention are:

uniform behavior of the blades in each point of their path on the plate even in case of not perfectly flat plates or in the presence of construction or assembly defects such as a non-perfect perpendicularity between driving shaft and cutting plate, imperfect parallelism between cutting plate and blade cutting edges plane, imperfect complanarity of the blades, elastic or thermal deformations of the plate, etc.;

possibility of operating in a range of very high cutting speeds, not contra-indicated with regard to wear and favorable to the detachment of the granules from the blades;

easy positioning and regulation of the blades against the plate;

possibility of granulating any type of polymer due to the contact between blades and plate;

regular operation and low maintenance requirement.

The construction and operating characteristics of the present cutting device for the hot granulation of thermoplastic polymers can be better understood from the following detailed description, in which reference is made to the figures of the accompanying drawings representing some preferred, exemplifying, but not limiting embodiments of the present invention, and in which:

FIG. 1 is a schematic plan view of an embodiment of the present invention;

FIG. 2 is a schematic view of a section of the embodiment shown in FIG. 1, along the Line A—A;

FIG. 3 shows the schematic view from B—B of a particular of the embodiment represented in FIG. 1;

FIG. 4 is a schematic plan view of another embodiment of the present invention;

FIG. 5 is a schematic view of a section of the embodiment of FIG. 4, along the line A—A; and FIG. 6 is a schematic view from B—B of a detail of the embodiment represented in FIG. 4.

In the Figures, corresponding or identical parts are indicated with the same reference numbers.

With reference to FIGS. 1, 2 and 3, a form of embodiment of the cutting device for the hot granulation of thermoplastic polymers object of the present invention comprises a cutting plate (4), provided with holes (5) for the polymer extrusion, in front of which the blade-carrying disc (1), keyed onto the driving shaft (2), is arranged.

Each blade (3) is applied to the blade-carrying disc (1) by means of an axial joint consisting of piston (6) and of the relevant sliding guide (10), machined in the blade-carrying disc (1) perpendicularly to plate (4).

At the end of each piston (6) in front of plate (4), blade (3) and the relevant sliding block (9) are received in a proper seat (13) of piston (6) and fixed to piston (6) by fixing elements (11). Each blade (3) is pushed against plate (4) by a spring (7), arranged in a seat machined in the blade-carrying disc (1), acting on piston (6) and opposed by an adjustment screw (8) screwed on blade-carrying disc (1). Piston (6) slides within guide (10) due to the thrust imparted by spring (7) and by any action causing an axial movement of blade (3). The cutting edge of each blade (3) and the sliding surface of each sliding block (9) have rather small dimensions, as they concern only one crown of extrusion holes (5).

With a view to preventing piston (6) from rotating around its axis, there is a guiding element (12), the positioning of which also permits modification of the orientation of blade (3).

Blades (3) may be of the shears type, or they may be inclined on the plate, in order to carry out a knife-type cut, either by a proper shaping thereof, or by arranging piston (6) with the axis oblique with respect to the face of cutting plate (4).

During operation of the device, blades (3), subjected to the pushing action of spring (7) and to the sustentation by sliding block (9), slide on plate (4); the wear of blade (3) due to the sliding on plate (4) cannot exceed the value of sliding block wear, (9).

At the impact of blade (3) against the polymeric monofilament leaving the extrusion hole (5), blade (3) receives a thrust with components which are parallel and perpendicular, respectively, to the face of plate (4). The parallel component is effectively opposed by the mechanical resistance of blade (3) and of piston (6), while the perpendicular component is opposed by the elastic thrust of spring (7).

The form of embodiment of the device of this invention, represented in FIGS. 4, 5, 6 differs from that of FIGS. 1, 2, 3 in that piston (6) accomplishes the double function of an axial joint between blade (3) and blade-carrying disc (1), and of an opposing element of the inertial-mass type. It is equipped with a resetting spring (7), arranged in a seat in piston (6), and opposed by an adjustment screw (8) screwed on blade-carrying disc (1). Said piston (6) can slide within seat (10) under the thrust of resetting spring (7) and of any action causing an axial movement of blade (3).

During operation of the device, blades (3), subjected to the thrusting action of spring (7) and to the sustentation of sliding block (9), slide on cutting plate (4); at the impact of blade (3) against the polymeric monofilament leaving extrusion hole (5), blade (3) undergoes a thrust with components which are parallel and perpendicular, respectively, to the face of plate (4). The parallel component is effectively opposed by the mechanical resistance of blade (3) and of piston (6), while the perpendicular component is opposed by the inertial reaction of piston (6). Therefore, the mass of piston (6) is dimensioned as a function of the cutting force required. Resetting spring (7) is adjusted by means of adjusting screw (8) in such a manner that the reset of the working position of blade (3) can occur before it reaches the subsequent extrusion hole.

In the practical embodiment of the present invention, various changes, modifications and variations can be made in the various parts which form the cutting devices illustrated for exemplifying purposes in the Figures of the accompanying drawings, without departing from the spirit or scope of the present invention.

What is claimed is:

1. A cutting device for the hot granulation of thermoplastic polymers comprising a blade-carrying disc rigidly fastened onto a rotary driving shaft, a plurality of blades not rigidly fixed to the blade-carrying disc, and a cutting plate with extrusion holes, said device being characterized in that each blade is provided with an adjustable system which pushes said blade against the plate and each blade is integral with a sliding block that slides on the plate with indirect friction.

2. The cutting device according to claim 1, characterized in that each blade is rigid and is not rigidly fixed to the blade-carrying disc by being attached to an axial joint, which permits the blade to move away from, as well as towards, the plate.

3. The cutting device according to claim 2, characterized in that the axial joint is a guided piston.

4. The cutting device according to claim 2, characterized in that the axial joint is an articulated parallelogram.

5. The cutting device according to claim 1, characterized in that the adjustable system which pushes the blade against the plate is interposed between the blade and the blade-carrying disc.

6. The cutting device according to claim 5, characterized in that the adjustable system is an elastic means.

7. The cutting device according to claim 5, characterized in that the adjustable system is a hydraulically, pneumatically or electromagnetically operated device.

8. The cutting device according to claim 5, characterized in that the adjustable system is selected from the group consisting of an opposing element which opposes any sudden action tending to move the blade away from the plate, and of an elastic adjustable element having a resetting function and capable of carrying the blade back into contact with the plate after each variation.

9. The cutting device according to claim 8, characterized in that the opposing element is a mass housed in an appropriate guide of the blade-carrying disc and capable of transmitting to the blade an inertial reaction with a component perpendicular to the plate face and directed against the same.

10. Ihe cutting device according to claim 8, characterized in that the opposing element is a guided piston.

11. The cutting device according to claim 9, characterized in that the opposing element is a guided piston.

12. The cutting device according to claim 8, characterized in that the opposing element is a hydraulic shock absorber.

13. The cutting device according to claim 8, characterized in that the opposing element is an electromagnetic-reaction system or an electronic control system.

14. The cutting device according to claim 8, characterized in that the adjustable elastic element exerting a resetting function is a spring, or a hydraulically, pneumatically or electromagnetically driven device.

15. The cutting device according to claim 1, characterized in that the sliding block sliding with indirect friction on the plate by hydraulic or hydrostatic sustentation.

16. The cutting device according to claim 15, characterized in that cooling fluid present in a cutting chamber of the device is utilized for the hydraulic or hydrostatic sustentation.

17. The cutting device according to claim 1, characterized in that the sliding block is made of a member of the group consisting of graphite, carbon, filled graphites, filled carbons, ceramic materials, metals, alloys, filled plastic materials, and non-filled plastic materials.

18. The cutting device according to claim 1, characterized in that the sliding block which slides on the plate with indirect friction is a magnetic-sustentation sliding block or an electrostatic-sustentation sliding block.

19. The cutting device according to claim 1, characterized in that the sliding block is made of a fluorinated resin.

20. The cutting device according to claim 1, characterized in that the sliding block is made of an epoxy resin.

21. The cutting device according to claim 1, characterized in that each blade and the corresponding sliding block cover, in their movement, only one crown of extrusion holes.

* * * * *